RESONANT REED TONE OSCILLATOR ENCODER AND DECODER

Filed Jan. 5, 1966

INVENTORS:
WAYNE D. DALTON,
RICHARD B. SANGER,
BY I. David Blumenfeld
THEIR ATTORNEY.

United States Patent Office 3,332,034
Patented July 18, 1967

3,332,034
RESONANT REED TONE OSCILLATOR ENCODER AND DECODER

Richard B. Sanger and Wayne D. Dalton, Lynchburg, Va., assignors to General Electric Company, a corporation of New York Filed Jan. 3, 1966, Ser. No. 518,104
8 Claims. (Cl. 331—116)

ABSTRACT OF THE DISCLOSURE

A transistorized tone oscillator encoder and decoder circuit is described. The oscillator includes a transistor with direct magnetic positive feedback between the collector-output and the base-emitter input circuits by means of a tap on the coil of a frequency-determining resonant reed. In a modification, negative feedback is introduced through an unbypassed emitter-resistor, so that the oscillator is oscillating weakly in the standby state, thereby minimizing current drain. A switching arrangement shorts the feedback resistor in the encoding state, increasing the positive feedback, and the oscillator goes into vigorous oscillation. The oscillator may also be used as a decoder by biasing it either barely into cutoff, or into a weakly oscillating state. Input terminals are coupled to the tapped reed coil so that the appearance of a tone signal of the proper frequency supplies sufficient reed drive to cause the circuit to break into vigorous oscillation. A biased diode rectifying circuit is coupled to the oscillator output to produce a D.C.-control signal whenever a tone signal of the proper frequency is received by the decoder.

This invention relates to an oscillator particularly useful in selective calling systems for performing both the tone coding and decoding function, an oscillator which utilizes a frequency selective resonant reed, and more particularly one which is simple in construction, inexpensive to manufacture, and efficient in operation.

In many selective calling applications, and particularly in those associated with two-way vehicular communication, it is customary to establish communication with a selected receiver by impressing on the carrier wave, in addition to the intelligence, a selected tone signal to which only a predetermined receiver is responsive. Such selective calling signalling arrangements are customarily known as "tone squelch" systems in that the receiver squelch circuitry is disabled and thereby permits the receiver to be operative only if the predetermined tone is also present on the received modulated carrier signal. Customarily, such systems include a "tone oscillator" at the transmitter to provide the encoding function, i.e., modulating the selected tone signal onto the carrier in order to select only a predetermined receiver. Similarly, some means must be provided at the receiver for sensing and detecting the tone signal to disable the squelch circuitry and permit the receiver to become operative only if a tone of a predetermined frequency is present. In the past, the encoding oscillator customarily utilized a vibrating reed as the frequency-determining element, which reeds, depending on the size and configuration, were resonant at a predetermined frequency. Typically, one of these prior-art tone oscillator encoding devices included a plurality of phase-inverting stages to provide the 360° phase shift around the loop and utilized a resonant reed as the frequency-selecting element in the feedback loop. At its resonant frequency, the impedance of the reed and its associated winding is at a maximum and the corresponding signal phase shift is at a minimum. Therefore, only at the preselected frequency is the phase shift around the loop equal to 360° to initiate and sustain oscillation. One example of such an arrangement is illustrated and described in U.S. Patent No. 2,759,103 issued Aug. 14, 1956.

While satisfactory, these oscillators require two individual phase-inverting stages to provide the proper feedback and thus add the expense of an extra stage. It is desirable, therefore, to provide an oscillator circuit for providing the encoding function, which utilizes but a single active device and, hence, is inexpensive to manufacture. Furthermore, by using but a single active device, the amount of current drain is reduced. In vehicular communication systems, which operate from a power source of finite and often quite limited capacity, i.e., the battery of a car, this factor is of great importance and economic value.

It is, therefore, a primary objective to provide a tone oscillator useful in providing the encoding function for a selective calling arrangement in a communication system, which is simple in construction, inexpensive to fabricate, and efficient in operation.

A further objective of the invention is to provide a tone oscillator useful in providing the encoding function in a selective calling arrangement for a vehicular communication system which utilizes but a single active device in the oscillator.

In decoding, the tone squelch circuitry must be disabled in response to the receipt of a predetermined tone signal modulated onto the carrier. This has typically been performed by using one or more resonant reeds connected in series between a D.C. supply source and a storage capacitor. Upon receipt of the selected tone signal, the reed is driven into vibration, intermittently closing contacts associated with the reed and completing a conductive path between the D.C. source and the capacitor. When the capacitor is thus charged, it is utilized to disable the squelch circuitry and thereby permit the receiver to assume the operative condition. The use of contacts in association with the resonant reeds, of course, introduces difficulties since the contact and reeds must be periodically adjusted, and they must be periodically replaced since they do draw current when contact is made and broken, producing arcing and pitting of the contacts. The cost of the reed element is, of course, also increased due to the need for these small and delicate contact elements which must be precisely positioned for proper operation. It is highly desirable, therefore, to provide a tone decoder which eliminates contacts hitherto associated with the resonant reed. By utilizing an oscillator configuration which includes a resonant reed and utilizing the received tone to excite the reed and the oscillator into oscillation, all contact elements may be eliminated while, at the same time, permitting use of the general oscillator configuration as both an encoder and decoder in a tone selective system with minimal changes in the configuration.

It is, therefore, a further objective of this invention to provide a decoder for a selective calling arrangement in a communication system in which use of mechanical contacts in association with the resonant reed is eliminated.

Still another objective of this invention is to provide a decoder circuit for a selective calling arrangement in a two-way vehicular communication system, wherein the decoder has generally the same configuration as the encoder and the same system may be used interchangeably or with a minimum amount of change for performing both of these functions.

Yet a further object of the invention is to provide a decoder/encoder for selective signalling arrangement in a two-way vehicular communication system which is simple in operation, simple in construction, and manufacturable at low cost because of interchangeable use as both a decoder and encoder.

Further objectives and advantages of the invention will become apparent as the description thereof proceeds.

The various objectives and advantages of the invention are achieved, in one form thereof, by providing a basic oscillator configuration which may be utilized both as a tone encoder and a decoder. The basic oscillator configuration is also inexpensive to manufacture and very simple in construction and utilizes but a single active element in combination with a frequency-resonant reed. The input and output electrodes of the active transistor device are coupled respectively to one end and to an intermediate tap on the resonant reed winding, so that direct magnetic feedback at the reed frequency is used to initiate and sustain oscillation. By tapping off the resonant reed winding, a simple oscillator using but a single active device is provided. As an encoder, this circuit is biased and so adjusted that the feedback is sufficiently large to maintain the device in the free-running or oscillating condition. On the other hand, when used as a decoder, the device is so biased and adjusted that the feedback is insufficient to maintain the device in oscillation or maintains it in very weak oscillation. The incoming tone signal is coupled to the reed winding. The application of a tone of the same frequency as the reed resonant frequency produces sufficient added reed drive to cause the circuit to break into oscillation and produces an output signal which may be rectified and used to disable the tone squelch circuit. By utilizing the tone signal to excite an oscillator sufficiently to cause it to break into oscillation, the contacts normally associated with reed decoding devices are eliminated with the attendant simplification in the circuit and reduction in the cost and complexity of the overall device.

The various features of the invention, which are believed to be new and novel, are set forth with particularity in the appended claims. The invention, itself, however, may best be understood by reference to the following description, when taken into conjunction with the accompanying drawings, in which:

Figure 1:
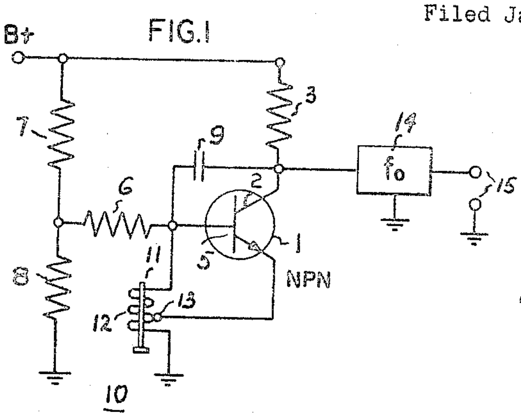
FIGURES 1–2 are the various embodiments of the oscillator tone encoder.

FIGURE 1 illustrates, in its simplest form, an oscillator configuration of the type utilizing a single active element and a resonant reed to establish direct magnetic feedback. An NPN transistor 1 is the active element of the oscillator and includes a collector 2, connected through collector-resistor 3 to the positive B+ terminal of a source of supply voltage. Base 5 of the transistor is connected through a current-limiting resistor 6 to the junction of a pair of voltage-dividing resistors 7 and 8, connected between the positive terminal and ground. The voltage-divider resistors are so adjusted that transistor 1 is forward-biased and conducting. Feedback to maintain the oscillation at a predetemined frequency is obtained by the combination of a feedback capacitor 9, connected between the collector and base of the transistor and a resonant reed arrangement, shown generally at 10, consisting of a reed 11 and a winding 12. Reed 11 is constructed in the customary manner so that the reed is resonant at and has its maximum excursions at a single predetermined frequency. The reed and winding are in a flux exchange relationship so that movement of the reed within winding 12 induces a voltage within the coil and, conversely, application of a signal to the winding which is at the reed resonant frequency drives the reed with maximum amplitude. In order to provide the positive feedback necessary to maintain oscillation, the emitter is connected to an intermediate tap 13 on winding 12, so that at the resonant frequency, the induced voltage developed across the portion between intermediate tap 13 and the end of the winding connected to base 5 is of the proper amplitude and phase to maintain oscillations.

The reed and winding shown generally at 10 is characterized by the fact that at all frequencies but the frequency at which the reed is resonant, the reed is at rest or has a motion of such small amplitude that no voltage is induced in winding 10 associated with the reed, or conversely, the application of a signal at a frequency other than the resonant frequency produces no motion in the reed. However, at the reed resonant frequency, the reed is driven into strong mechanical vibration and induces a substantial voltage at the resonant frequency in the winding. In fact, a reed-coil combination of this type at the resonant frequency acts in effect as a parallel anti-resonant circuit, i.e., one having a high impedance and developing a maximum voltage across the winding. Thus, the configurations shown in FIGURE 1 may, in one way, be compared with the "Hartley" oscillator configuration and operates essentially in a very similar mode. The resonant reed and winding combination shown at 10 is old and well-known in the art. For a detailed description of one such resonant reed device, attention is again called to the Patent No. 2,759,103 previously noted.

In order to minimize the susceptibility of the oscillator circuit to erratic operation due to shock and/or vibration (environmental characteristics which are very prevalent in mobile or vehicular usage), it may be desirable that the oscillator output be at a maximum. In fact, it may be desirable, in order to minimize these effects, to drive the oscillator hard enough so that the transistor 1 operates between saturation and cut-off, i.e., the output of the transistor is in essence a square wave at the resonant frequency of the reed. In order to convert the square wave output from the oscillator to a sine wave which, in the case of an encoder, is modulated onto the carrier, the collector or output electrode is coupled to the input of a filter or other circuit 14 resonant at the oscillator frequency. The square wave input to filter 14 is, of course, converted in the filter or resonant circuit to a sine wave, which, in turn, is applied to output terminal 15 and thence through any suitable push-to-talk switch or other mechanism to the modulator of the transmitter for modulation on the carrier wave.

Figure 2:
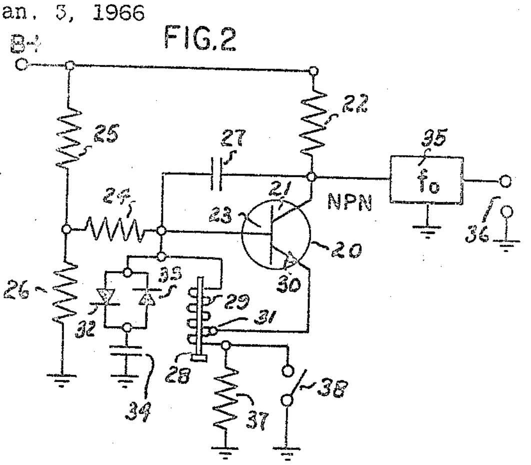

In order to maintain frequency stability of the circuit illustrated in FIGURE 1, particularly those that may be caused by voltage supply variation, it may be necessary to limit the excursion of the base-emitter feedback signal and thereby stabilize the reed excitation. Furthermore, in order to minimize current drain, it may be desirable to reduce the oscillation level during standby and to raise it to the desired level only during encode. FIGURE 2 illustrates an oscillator used as a tone encoder which includes drive signal and current-limiting circuitry.

The basic oscillator is very similar to that of FIGURE 1 and again consists of an NPN transistor 20 having a collector 21, connected through a collector-resistor 22 to the positive or B+ terminal of the source of supply voltage. The base 23 is connected to a current limiting resistor 24 to the junction of a pair of voltage dividing resistors 25 and 26, connected between the B+ supply terminal and ground. As pointed out previously, the values of the voltage-dividing resistors is such that the transistor is forward-biased and conducting current. The signal feedback and frequency-determining network for providing the desired oscillations are again provided by means of a feedback capacitor 27 connected between the collector and the base, and a resonant reed combination consisting of a reed 28 and a reed winding 29. Emitter 30 is connected to an intermediate tap 31 on the reed winding, so that at the resonant frequency of the reed, magnetic feedback between winding section is provided to develop a positive, in-phase, feedback signal between the upper end of winding 29 and the intermediate tap.

In order to limit the excursion of the base signal and, hence, to stabilize the reed drive, a network is provided between base 23 and ground which limits the base excursion. This network includes a pair of diodes 32 and 33, connected in parallel and also poled for opposite direction of current conduction, connected in series with a storage capacitor 34. It will be obvious that during the positive and negative excursions of the feedback signal, diodes 32 and 33 are driven into conduction to clip or limit the feedback signal if that signal exceeds a predetermined level. In this manner, the base drive for the transistor 20 forming part of the oscillator is limited, stabilizing the reed excitation and producing a constant output signal.

The output signal from the oscillator is again coupled through a filter 35, resonant at the oscillator frequency, to a pair of output terminals 36. In the manner described previously, filter or resonant circuit 35 converts the clipped wave shapes produced by the oscillator to sinusoidal waves which are applied to the output terminals 36 and thence to the modulator of the transmitter for modulation onto the carrier signal.

It is desirable to limit the current drain on the power source, particularly if the encoder is to be used in a vehicular two-way communication system or in a two-way communication system of the type carried on the person, where the power source is of a finite and often limited capacity. At the same time, it is highly desirable to have the encoder continuously operative, but operating at a lower current drain in the standby condition when no transmission is taking place and to switch it into the high-level operating condition rapidly when transmission is about to take place. Thus, the circuit of FIGURE 2, as will be presently described, includes a given amount of negative feedback and is thus operated in a weakly oscillating condition in the standby state when no transmission is taking place. In the encoding state, the negative feedback is removed and the oscillator is permitted to go into vigorous oscillation. To this end, emitter 30 is connected through the lower portion of winding 29 and an unbypassed resistor 37, to ground. The unbypassed resistor, therefore, reduces the reed drive signal by introducing negative feedback. That is, the voltage drop across unbypassed resistor 37 is out of phase with the voltage at the base of the transistor, thereby reducing the feedback. The resistor is made sufficiently large to produce a negative feedback which is not large enough to prevent the circuit from oscillating, but is large enough so that the circuit is oscillating very weakly, i.e., enough drive to overcome the starting inertia of the reed, but insufficient to produce output oscillation of large amplitude. Connected across resistor 37 is a normally-open switch 38, which may, for example, be the push-to-talk switch on a two-way or personal or portable radio.

With the two-way radio in the receiving state, switch 38 is open and the encoding tone oscillator is in the standby state and oscillating very weakly. Whenever the two-way radio equipment is to transmit, the operator actuates the push-to-talk switch, which, in turn, closes normally open switch 38, thereby shorting out the negative feedback resistor 37, placing the oscillator in the encode condition and increasing the feedback to the base of the transistor sufficiently to drive the oscillator into vigorous oscillation. The switching arrangement illustrated in FIGURE 2 is capable of reducing the drain on the power source by at least 75%, saving considerable battery capacity in either mobile or portable equipments.

Figure 3:
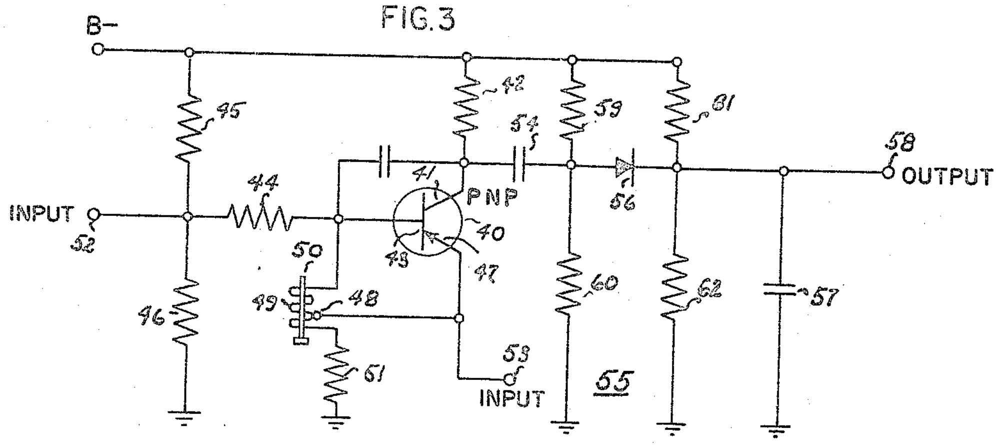
FIGURES 3–4 illustrate embodiments of the oscillator as a decoder.

The oscillator circuit, shown functioning as a tone encoder in FIGURES 1–2, may be utilized as decoder with but a minimal change in component values and auxiliary equipment. Such an arrangement is illustrated in FIGURE 3 where the oscillator is combined with a gated diode network tone. In this instance, the oscillator includes a PNP transistor 40, having a collector 41 connected through a collector-resistor 42 to the negative terminal B— of a source of supply voltage. The base 43 is connected again through the current-limiting resistor 64 to the junction of a pair of voltage-dividing resistors 45 and 46, connected between the B— terminal and ground. Emitter 47 is again connected to an intermediate tap 48 on the winding 49 associated with a resonant reed 50. The upper part of the winding is connected to the base and the lower end is connected through an unbypassed resistor 51 to ground potential. The voltage-dividing resistors 45 and 46 and the emitter-resistor 51 are so adjusted that the oscillator is biased either below the point of oscillation, or is oscillating. A pair of input terminals 52 and 53 may be provided to apply the incoming tone signal to the oscillator. The application of the tone signal of the same frequency as the resonant frequency of reed 50 supplies sufficient additional reed excitation to drive the oscillator circuit into vigorous oscillation to produce a sinusoidal output voltage of substantial magnitude. This sinusoidal output voltage produced by the oscillator is coupled through a capacitor 54 to a biased diode circuit 55. Diode gate 55 includes a diode 56 poled for the forward direction of current flow, coupled to a storage capacitor 57. Capacitor 57 charges to a positive voltage, whenever a tone signal of the proper frequency is present and the oscillator is actuated. The unidirectional voltage appearing across capacitor 57 is applied from terminal 58 to the tone squelch circuitry of the receiver in order to disable it and permit the receiver to operate properly.

Diode circuit 55 is back-biased to prevent inadvertent and false operation of the decoder circuit. Such false operation of the decoder circuit could be due either to extreme vibration or shock for a short interval, a situation which is not unusual where the device is in a moving vehicle, or undesired noise which may either excite the oscillator or leak through. By reverse-biasing diode 56 by an amount equal to a value greater than the peak value of any expected random noise signals, the diode will discriminate against these noise signals. The two voltage dividers consisting of voltage divider resistors 59, 60, 61 and 62 are provided to establish this threshold level and to back-bias the diode. As will be seen, the diode 56 is connected to the junction of these four resistors with its anode connected to the junction of resistors 59 and 60, and its cathode connected to the junction of resistors 61 and 62. The relative values of the resistor combinations are such that the voltage at the junction of resistors 59 and 60 is more negative than the voltage at the junction of resistors 61 and 62. Consequently, diode 56 is reverse-biased by a predetermined amount. The amount of reverse-biasing is obviously set by the maximum noise voltage expected.

In order to protect the decoder against falsing due to extreme vibration or due to noise impulses driving the oscillator into strong oscillation for a short interval of time, the time constant of capacitor 57 and resistor 62 is made sufficiently large so that short-term random excitation of the oscillator due to shock and vibration or a noise impulse will not produce a unidirectional output at terminal 58 to disable the squelch circuit. That is, only if the oscillator is operating for a predetermined period of time, a period of time selected to make it highly unlikely that random vibration and shock or random noise signals are the cause of the oscillation, does capacitor 57 charge to a sufficiently high value to produce an output at terminal 78 capable of disabling the squelch circuit. Thus, by the combination of the back-bias gated diode and the time constant of the network associated with this diode, the decoding circuit illustrated in FIGURE 3 is protected against accidental and inadvertent operation due to shock, vibration, or random noise signals.

Figure 4:
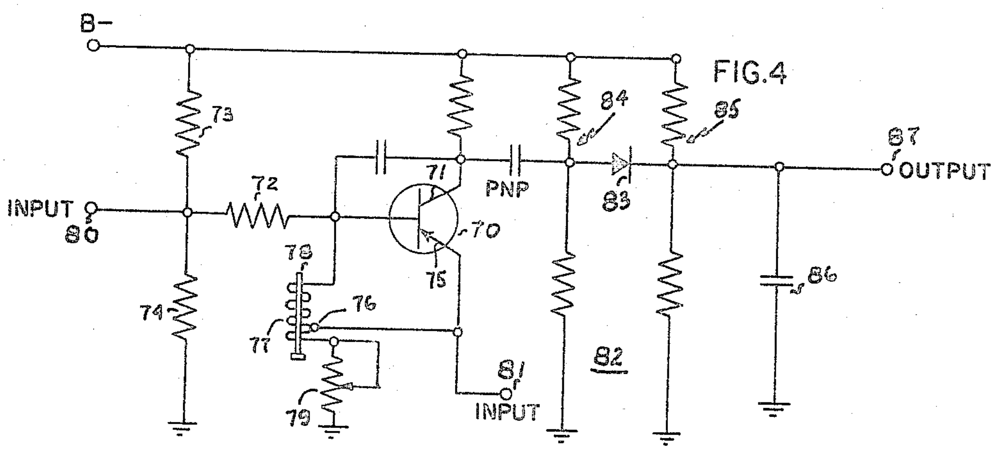

FIGURE 4 is a modification of the encoder configuration of FIGURE 3 in which the oscillator is oscillating weakly in the absence of a tone, and is driven into strong oscillation upon appearance of the proper tone. In the standby state, the amplitude of the oscillations is not sufficient to exceed the reverse bias on the diode gate so that there is no output to disable the tone squelch. The oscillator includes NPN transistor 70 having its collector 71 connected through a suitable resistor to the B— terminal of a supply source. The base 72 is connected through current-limiting resistor 72 to the junction of voltage divider resistors 73 and 74. Emitter 75 is connected to intermediate tap 76 on a winding 77 associated with frequency-determining vibrating reed 78. A variable resistor 79 is connected between the lower end of winding 77 and ground. Resistor 79 and the voltage divider parameters are so adjusted that the oscillator is oscillating weakly in the absence of a tone signal of the proper frequency at input terminals 80 or 81. The amplitude of the oscillations in this state is insufficient to overcome the back-biasing of diode gate 82 so that no output appears at terminals 83 to disable the receiver "tone squelch" circuitry.

Diode gate 82 includes a diode 83 back-biased by the voltage dividers 84 and 85 so that the diode does not conduct to charge capacitor 86 unless the oscillator output exceeds a predetermined level, a condition which prevails only if a tone signal of the proper frequency is impressed on terminals 80 or 81.

While a particular number of embodiments of the invention have been described and shown, it will be understood that the invention is not limited thereto, since many modifications and variations in the circuit arrangements for carrying out the invention may be made. It is contemplated that the appended claims cover any such modifications as fall within the true spirit and scope of this invention.

What is claimed as new and desired to be secured by Letters Patent of the United States is:

1. In a tone encoder for producing an output tone signal, an oscillator comprising,
(a) a transistor having input, output and common electrodes,
(b) biasing means for said transistor,
(c) a frequency-determining network including a vibrating reed resonant at a predetermined frequency, a winding magnetically coupled to said reed, an intermediate tap on said winding,
(d) means connecting said common electrode to said intermediate tap,
(e) means connecting said input electrode to one end of said winding and means coupling the other end of said winding to a point of reference potential whereby at the predetermined resonant frequency of said reed positive feedback across the winding portion between the intermediate point and said input electrode produces oscillations at the predetermined frequency,
(f) negative feedback means between said other end of the winding and said point of reference potential, said negative feedback being effective to reduce the amplitude of the output oscillations, but insufficient to terminate oscillations, and switch means for selectively removing said negative feedback and increasing the amplitude of oscillation, whereby said oscillator is oscillating weakly during standby and vigorously during encoding when said switch is actuated.

2. In a tone encoder according to claim 1 including means to limit the feedback signal at the common electrode of said transistor and the drive for said reed in order to stabilize the amplitude of the output oscillations.

3. The tone encoder according to claim 2 which includes a pair of oppositely poled diodes coupled to said common electrode which conduct to limit the feedback signal whenever it exceeds a predetermined value.

4. In a tone decoder for producing an output control signal in response to the receipt of a tone signal of predetermined frequency, the combination comprising an oscillator including
(a) a transistor having input, output and common electrodes,
(b) a frequency-determining network including a resonant reed element resonant at said predetermined frequency, a winding magnetically coupled to said reed, a tap intermediate the ends of said winding,
(c) means connecting the common electrode to said tap and said input electrode to one of said ends to establish a feedback to said input electrode,
(d) input terminal means adapted to receive tone signal and coupled to said winding,
(e) biased diode gating means coupled to the output electrode of said transistor whereby an output control signal is produced only if the oscillator output exceeds a predetermined amplitude,
(f) biasing means for said transistor to establish biasing condition such that in the absence of a tone signal applied to said winding, there is insufficient feedback to produce oscillations of a predetermined amplitude.

5. The decoder according to claim 4 wherein said oscillator is biased to be cut-off in the absence of a tone signal of predetermined frequency.

6. The decoder according to claim 4 wherein said oscillator is biased to be oscillating weakly and produce an output which is less than the predetermined amplitude.

7. The decoder according to claim 4 wherein said biased diode gate includes first and second voltage dividers, a diode coupled between said dividers at points such that the diode is reverse-biased by a predetermined amount, and capacitor means coupled to said diode whereby said capacitor is charged to produce a unidirectional control signal only if the oscillator amplitude exceeds a predetermined amplitude in response to receipt of a tone signal of a predetermined frequency.

8. The decoder according to claim 4 including a resistor-capacitor combination coupled to the output of the diode gate, said resistor-capacitor combination having a time constant which is large compared to the period of the oscillations to ensure that said encoder produces a D.C. output signal only in response to receipt of a tone signal and not to oscillations produced by random vibration, shock, or random noise.

References Cited

UNITED STATES PATENTS 2,942,205 6/1960 McShan ------------ 331—116

FOREIGN PATENTS 992,253 5/1965 Great Britain.

OTHER REFERENCES

Electronics, Feb. 1, 1967, page 198.

ROY LAKE, *Primary Examiner.*

JOHN KOMINSKI, *Examiner.*